United States Patent
Douglas et al.

(10) Patent No.: US 10,317,914 B2
(45) Date of Patent: Jun. 11, 2019

(54) WIND FINDING AND COMPENSATION FOR UNMANNED AIRCRAFT SYSTEMS

(71) Applicant: Latitude Engineering, LLC, Tucson, AZ (US)

(72) Inventors: Jason Michael K. Douglas, Tucson, AZ (US); Justin Armer, Tucson, AZ (US); Carlos Murphy, Tucson, AZ (US)

(73) Assignee: LATITUDE ENGINEERING, LLC, Tucson, AZ (US)

(*) Notice: Subject to any disclaimer, the term of this patent is extended or adjusted under 35 U.S.C. 154(b) by 338 days.

(21) Appl. No.: 15/131,914

(22) Filed: Apr. 18, 2016

(65) Prior Publication Data

US 2017/0300066 A1    Oct. 19, 2017

(51) Int. Cl.
*G05D 1/08* (2006.01)
*B64C 29/00* (2006.01)
*B64C 39/02* (2006.01)

(52) U.S. Cl.
CPC ....... *G05D 1/0816* (2013.01); *B64C 29/0008* (2013.01); *B64C 39/024* (2013.01); *G05D 1/0833* (2013.01); *G05D 1/0858* (2013.01); *B64C 2201/024* (2013.01); *B64C 2201/042* (2013.01); *B64C 2201/044* (2013.01); *B64C 2201/088* (2013.01); *B64C 2201/108* (2013.01); *B64C 2201/141* (2013.01)

(58) Field of Classification Search
CPC ................ B64C 29/008; B64C 39/024; B64C 2201/024; B64C 2201/042; B64C 2201/44; B64C 2201/088; B64C 2201/108; B64C 2201/141; G05D 1/0816; G05D 1/0833

USPC ....................................................... 244/17.19
See application file for complete search history.

(56) References Cited

U.S. PATENT DOCUMENTS

| 4,003,532 A * | 1/1977 | Adams, Sr. .......... G05D 1/0061 244/17.13 |
| 4,067,517 A * | 1/1978 | Barnum ............... G05D 1/0061 244/17.13 |
| 5,178,307 A * | 1/1993 | Wright .................. B64C 13/503 244/17.13 |
| 5,244,167 A * | 9/1993 | Turk ......................... B64C 9/38 244/12.1 |
| 9,120,560 B1 | 9/2015 | Armer |
| 9,682,772 B2 * | 6/2017 | Yoon ........................ B60F 5/02 |
| 10,012,999 B2 * | 7/2018 | Chandra ............. G05D 1/0808 |

(Continued)

OTHER PUBLICATIONS

International Search Report and Written Opinion for PCTUS177524, dated Jul. 17 2017, 11 pages.

*Primary Examiner* — Richard R. Green
*Assistant Examiner* — Brady W Frazier
(74) *Attorney, Agent, or Firm* — Sheppard, Mullin, Richter & Hampton LLP (57) ABSTRACT

An unmanned aircraft includes a forward propulsion system comprising one or more forward thrust engines and one or more corresponding rotors coupled to the forward thrust engines; a vertical propulsion system comprising one or more vertical thrust engines and one or more corresponding rotors coupled to the vertical thrust engines; a plurality of sensors; and a yaw control system, that includes a processor configured to monitor one or more aircraft parameters received from at least one of the plurality of sensors and to enter a free yaw control mode based on the received aircraft parameters.

18 Claims, 4 Drawing Sheets

(56) References Cited

U.S. PATENT DOCUMENTS

| | | | |
|---|---|---|---|
| 10,023,323 B1* | 7/2018 | Roberts | B64D 43/00 |
| 2003/0085319 A1* | 5/2003 | Wagner | B64C 3/56 |
| | | | 244/12.3 |
| 2004/0129828 A1 | 7/2004 | Bostan | |
| 2005/0048918 A1 | 3/2005 | Frost | |
| 2011/0295569 A1* | 12/2011 | Hamke | G01P 5/00 |
| | | | 703/2 |
| 2015/0197335 A1* | 7/2015 | Dekel | B64C 29/0033 |
| | | | 701/5 |
| 2016/0046374 A1 | 2/2016 | Kugelmass | |
| 2016/0129998 A1* | 5/2016 | Welsh | B64C 39/024 |
| | | | 244/12.3 |
| 2016/0144957 A1* | 5/2016 | Claridge | B64C 29/02 |
| | | | 244/6 |
| 2016/0368600 A1* | 12/2016 | Frolov | G08G 5/0021 |

* cited by examiner

WIND FINDING AND COMPENSATION FOR UNMANNED AIRCRAFT SYSTEMS

TECHNICAL FIELD

The disclosed technology relates generally to aircraft control systems, and more particularly, some embodiments relate to providing yaw control for unmanned aerial vehicles.

DESCRIPTION OF THE RELATED ART

Unmanned aircraft have become ubiquitous in today's society. Their importance and value has grown dramatically in recent years, leading to widespread adoption in commercial, military and consumer market sectors. Part of the reason for their popularity is their low cost and small form factor as compared to piloted aircraft.

Hybrid aircraft use a combination of vertical takeoff and landing (VTOL) propulsion systems to allow the aircraft to take off and land vertically (e.g., like a helicopter) and forward propulsion systems for fixed-wing flight. A hybrid quadrotor aircraft, for example uses four VTOL rotors and one or more forward propulsion rotors. Quadrotor, octorotor, and other multi-rotor configurations for the VTOL propulsion system are popular because they allow attitude control as well as control of angular acceleration, rate, and even aircraft velocity and position. That is, flight dynamics can be controlled by individually controlling the motor power or RPM of each rotor to control the torque on the aircraft.

Typical fixed wing aircraft are inherently stable about the yaw axis with respect to the direction of the relative wind. The fixed aerodynamic surfaces will tend to provide a yaw moment that directs the nose of the aircraft into the oncoming airstream. In flight, the relative wind caused by the forward motion of the aircraft contributes to the yaw moment. However, at low speeds or in a hovering condition, the direction of relative wind and the desired orientation of the aircraft may not coincide.

Additionally, hybrid multirotor aircraft tend to have a large moment of inertia about the z axis, as compared to pure VTOL multirotor designs making rapid changes in yaw rate more difficult. Some conventional control methods use differential torque between rotors of opposing directions to provide a controlling yaw moment. The relationship of torque to thrust for each motor can be adjusted by such parameters as the disk loading (thrust per disk area), disk solidity, rotor RPM, etc. Such schemes, however, do not provide adequate control of the hybrid VTOL aircraft during hovering modes in which a non-trivial airspeed is required, such as hovering in windy conditions.

BRIEF SUMMARY OF EMBODIMENTS

According to various embodiments of the disclosed technology systems and methods for providing a yaw control scheme for an unmanned aircraft in which yaw control of the aircraft is monitored to detect conditions in which the aircraft should be placed into a free yaw control mode. In some embodiments, an unmanned aircraft includes a forward propulsion system comprising a forward thrust engine and a first rotor coupled to the forward thrust engine; a vertical propulsion system comprising a plurality of vertical thrust engines and a plurality of second rotors each coupled to one of the plurality of vertical thrust engines; a plurality of sensors; and a yaw control system, comprising a processor configured to monitor one or more aircraft parameters received from at least one of the plurality of sensors and to enter a free yaw control mode based on the received aircraft parameters. The free yaw control mode may include reducing or eliminating yaw control for the aircraft.

In various embodiments, entering the free yaw control mode based on the received aircraft parameters may be accomplished by determining whether yaw control is above a predetermined threshold and entering the free yaw control mode if the all control is above the determined threshold.

The processor may further be configured to monitor the aircraft to determine whether to exit the free yaw control mode. Monitoring the aircraft to determine whether to exit the free yaw control mode may include determining whether a forward thrust command for the aircraft is below a determined threshold.

The unmanned aircraft may be a multirotor aircraft and the vertical propulsion system can include four vertical thrust engines and four corresponding rotors.

In some embodiments, an unmanned aircraft system includes an unmanned aircraft, the aircraft including a forward propulsion system comprising a forward thrust engine and a first rotor coupled to the forward thrust engine; a vertical propulsion system comprising a plurality of vertical thrust engines and a plurality of second rotors each coupled to one of the plurality of vertical thrust engines; an onboard aircraft controller comprising a first output coupled to the forward propulsion system and a second output coupled to the vertical propulsion system; and a first communication transceiver coupled to the aircraft controller configured to communicate with a remote control system. The system may also include a remote control system, including a second communication transceiver configured to communicate with the unmanned aircraft; and an aircraft control system communicatively coupled to the second communication transceiver. A yaw control system may include a processor configured to monitor one or more aircraft parameters received from at least one of the plurality of sensors and to enter a free yaw control mode based on the received aircraft parameters. In various embodiments, entering the free yaw control mode based on the received aircraft parameters may be accomplished by determining whether yaw control is above a predetermined threshold and entering the free yaw control mode if the all control is above the determined threshold.

The processor may further be configured to monitor the aircraft to determine whether to exit the free yaw control mode. Monitoring the aircraft to determine whether to exit the free yaw control mode may include determining whether a forward thrust command for the aircraft is below a determined threshold.

In further embodiments, a method of yaw control of an aircraft includes monitoring one or more aircraft parameters received from at least one of the plurality of sensors and entering a free yaw control mode based on the received aircraft parameters. Entering the free yaw control mode may be based on the received aircraft parameters and can include determining whether yaw control is above a predetermined threshold and entering the free yaw control mode if the yaw control is above the determined threshold. The method may further include monitoring the aircraft to determine whether to exit the free yaw control mode.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing a yaw control scheme for an unmanned aircraft in which yaw control of the aircraft is monitored to detect conditions in which the aircraft should be placed into a free yaw control mode. For example, yaw control can be monitored to determine whether the amount of control needed or requested rises above a predefined limit. That is, when the yaw moment requested of the VTOL multirotor control system rises above a certain threshold. When that occurs, the aircraft can be placed into a free yaw control mode in which the yaw control is limited or even eliminated, allowing the aircraft to rotate about its yaw axis more or less free of yaw control, using the natural stability of the aircraft to orient the aircraft into the relative wind. Some amount of yaw control may continue to be included to damp rotation of the aircraft, but in some embodiments is not used to correct heading error.

When a forward thrust command for the aircraft is below a predefined limit, the system can return to a normal multirotor yaw control mode to control the yaw orientation. This can be done, for example, to control the yaw to a commanded value relative to the earth. This can be useful in hovering or low-velocity flight where the airspeed or velocity over ground is low enough that the relative wind is not materially controlling orientation.

Figure 1:
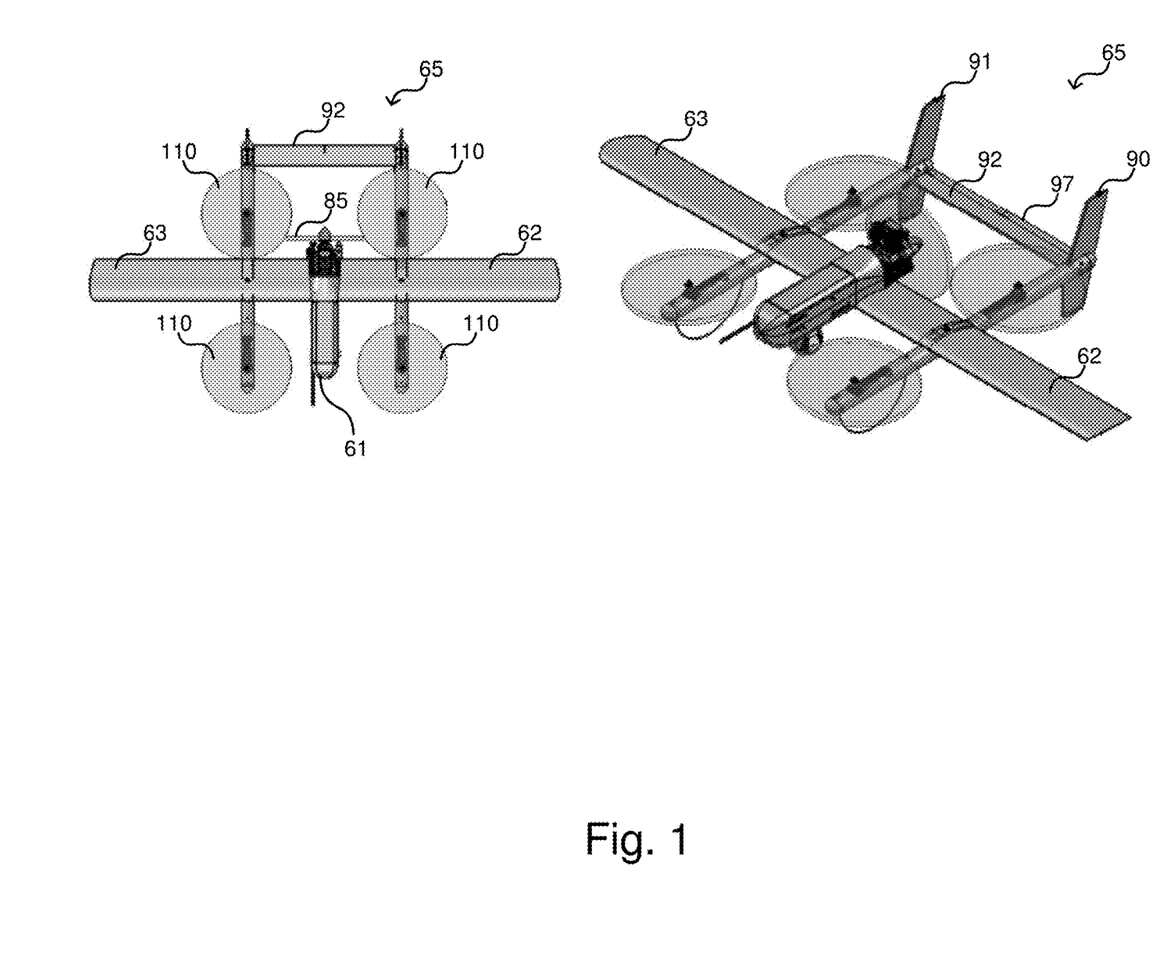
FIG. 1 illustrates an example unmanned vertical take-off and landing (VTOL) aircraft with which embodiments of the technology disclosed herein may be implemented.

Before describing embodiments of the systems and methods in detail, it is useful to describe an example aircraft with which such systems and methods can be used. FIG. 1 is a diagram illustrating an example unmanned vertical take-off and landing (VTOL) aircraft with which the technology disclosed herein may be implemented. Referring now to FIG. 1, this example aircraft is a hybrid quadrotor aircraft having an airframe that includes fuselage 61, fixed left and right wings 62 and 63, a tail assembly or empennage 65. Also shown are left and right tail boom supports (not numbered for clarity of the illustration), and left and right head boom supports. Left and right wings 62 and 63 are fixed to fuselage 61 to form a fixed wing airframe.

Left wing 62 and right wing 63 are airfoils that produce lift to facilitate aircraft flight. During flight, air passing over the wing creates a region of lower-than-normal air pressure over top surfaces of left and right wings 62 and 63, with a higher pressure existing on the bottom surfaces of left and right wings 62 and 63. This results in a net upward force acting on left and right wings 62 and 63 to generate lift. Left wing 62 is applied to and extends from left side of fuselage 61 and right wing 63 is applied to and extends from right side of fuselage 61. Although not shown, a left aileron is pivotally retained at the rear of left wing 62 near its outer or distal extremity, and a right aileron is pivotally retained at the rear of right wing 63 near the outer or distal extremity of right wing 63.

Empennage 65 gives stability to the aircraft, and is located behind and in spaced-apart relation to the trailing extremity of fuselage 61. In this embodiment, empennage 65 is exemplary of a twin tail assembly or twin tail empennage may include left and right vertical stabilizers 90, 91, and a horizontal stabilizer 92 extending between left and right vertical stabilizers. The left and right vertical stabilizers 90, 91 extend upward from a rear of their corresponding left and right tail boom supports while the horizontal stabilizer 92 is retained between left and right tail boom supports. Rudders, not shown, may be pivotally retained on the trailing edge of left and right stabilizers 90, 91. An elevator 97 is pivotally retained on a rear of horizontal stabilizer 92.

This example aircraft is a hybrid craft including separate rotors for forward and vertical thrust. Particularly, this example is a hybrid quadrotor "X" configuration. Accordingly, this example illustrates a forward thrust rotor 85, which is mounted to the rear extremity of fuselage 61 in front of empennage 65. Forward thrust rotor 85, which provides forward thrust to aircraft 50, is typically powered by a forward propulsion engine, sometimes referred to as a main engine. This example uses a single forward thrust rotor mounted at the rear of the fuselage 61. However, the technology can be applied to aircraft using one or multiple thrust rotors mounted at other positions.

The example aircraft also includes a VTOL propulsion system, or simply a VTOL system, to provide vertical thrust for vertical takeoff and landing operations. This example is a quadrotor VTOL system including four VTOL thrust rotors 110 in a quadrotor "X" pattern for providing vertical lift and yaw control authority to the aircraft. In other applications, the technology disclosed herein may be applied to aircraft having a different quantity of VTOL thrust rotors, or thrust rotors at different locations. VTOL aircraft can include fixed-mount VTOL thrust rotors or pivot-mount VTOL thrust rotors. Forward thrust engines and vertical thrust engines can be internal combustion engines or electric motors or a combination of the two in a hybrid configuration.

Having thus described an example aircraft and unmanned aircraft system with which one or more aspects of the disclosed technology can be implemented, various embodiments are now described. Although the disclosed technology may be described from time to time herein in terms of this example aircraft, one of ordinary skill in the art reading this disclosure will understand how aspects of the disclosed technology can be implemented with different aircraft and different aircraft configurations. This can include different configurations of unmanned aircraft as well as various configurations of manned aircraft.

Figure 2:
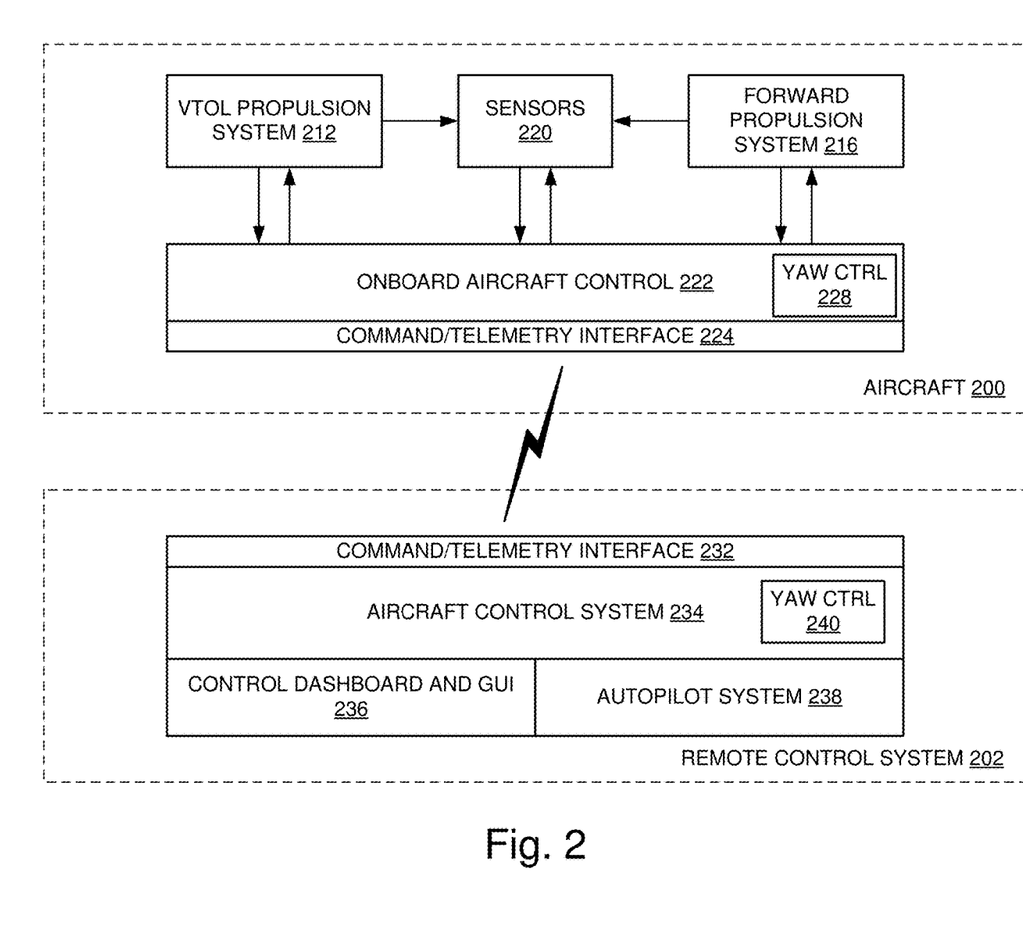
FIG. 2 is a diagram illustrating an example unmanned aircraft system in accordance with one embodiment of the systems and methods disclosed herein.

FIG. 2 is a diagram illustrating an example unmanned aircraft system in accordance with one embodiment of the systems and methods disclosed herein. Referring now to FIG. 2, the example illustrated in FIG. 2 includes an unmanned aircraft 200 and a remote control system 202 for the aircraft 200. In this example, aircraft 200 includes a VTOL propulsion system 212, a forward propulsion system 216, various sensors 220, and onboard aircraft control system 222, and a command/telemetry interface 224.

VTOL propulsion system 212 includes systems and components used for vertical takeoff and landing. This can include, for example, one or more rotors, corresponding engines or motors, and other systems associated with VTOL propulsion. In various embodiments, the rotor or rotors of VTOL propulsion system 212 are oriented horizontally or in an approximately horizontal configuration. The rotor or rotors of VTOL propulsion system 212 can be mounted in a fixed orientation, or can be movably mounted such that their orientation can be adjusted from the horizontal configuration. VTOL propulsion system 212 can include one or more inputs to receive data, commands, control information, or other information to operate or maintain the propulsion systems or components thereof. For example, a throttle control input can be provided to adjust the throttle setting for the propulsion system. VTOL propulsion system 212 can also include one or more outputs to send data and other information about the propulsion system to other instrumentalities such as, for example, onboard aircraft control system 222 or one or more sensors 220.

Forward propulsion system 216 includes one or more rotors, corresponding engines or motors, and other systems associated with forward propulsion. The rotor or rotors of forward propulsion system 216 are oriented vertically or in an approximately vertical configuration to provide forward or reverse thrust to the aircraft. The rotor or rotors of forward propulsion system 216 are generally mounted in a fixed orientation, but in some embodiments may be movably mounted such that their orientation can be adjusted from the vertical configuration. Forward propulsion system 216 can also include one or more outputs to send data and other information about the propulsion system to other instrumentalities such as, for example, onboard aircraft control system 222 or one or more sensors 220. Forward propulsion system 216 can include one or more inputs to receive data, commands, control information, or other information to operate or maintain the propulsion systems or components thereof. For example, a throttle control input can be provided to adjust the throttle setting for the propulsion system.

Sensors 220 can include one or more various sensors to sense operating parameters of the aircraft and its various systems and subsystems. For example, sensors 220 can include sensors such as temperature sensors, RPM sensors, airspeed sensors, altimeters, position determination systems (e.g. GPS or other position determination systems) vibration sensors, gyros, accelerometers, and so on. Sensors can accordingly sense conditions or other operating parameters of aircraft 200 and its various systems and subsystems. Although illustrated as a single block in this diagram, sensors 220 can include individual discrete sensors disposed in various positions about the aircraft to sense the appropriate parameters.

Command/telemetry interface 224 provides a communication interface to allow aircraft 200 to communicate, preferably two-way, with remote control system 202. Accordingly, command/telemetry interface 224 can include an antenna and a communication transceiver to provide wireless communications so they can receive command and control information from remote control system 202 as well as send data or other telemetry to remote control system 202.

Onboard aircraft control system 222 is provided to control the various components of the aircraft based on commands received from remote control system 202 (e.g., via the command/telemetry interface 224). Onboard aircraft control system 222 can also be configured to receive information from other aircraft components such as, for example, sensor data, and provide that information to command/telemetry interface 224 for transmission to remote control system 202.

Although the functional components of aircraft 200 (e.g., onboard aircraft control system 222, command/telemetry interface 224 and yaw control system 240) are partitioned in this example in the manner as illustrated in FIG. 2, it is noted that this partitioning is done for clarity of description and by way of example only. After reading this description, one of ordinary skill in the art will understand how different architectures or alternative partitioning can be used for systems of aircraft 200. Additionally, components such as processing devices, memory components, communications buses and so on can be shared among these multiple functional units. Indeed, in some applications, for example, a single microprocessor (whether single or multi-core) system can be used to implement the functions of onboard aircraft control system 222, and yaw control system 240, as well as portions command/telemetry interface 224, sensors 220, and even digital/electronic portions of the various propulsion systems.

Remote control system 202 in this example includes a command/telemetry interface 232, and aircraft control system 234 a control dashboard and user interface 236 and an autopilot system 238. Command/telemetry interface 232 provides a wireless communication interface to aircraft 200. In some embodiments, remote control system 202 can be used to command multiple aircraft, in which case command/telemetry interface 232 can provide a communication interface to multiple aircraft.

Control dashboard and GUI 236 provides a user interface to the remote pilot to allow the pilot to control one or more aircraft such as aircraft 200. Control dashboard and GUI 236 can be configured to provide visual, audible, and tactile feedback and information to the pilot regarding flight of the aircraft and various aircraft parameters. You can also include user input mechanisms to allow the pilot to control the aircraft remotely. These user input mechanisms can include, for example, buttons, switches, levers, joysticks, keys, touchscreen inputs, or other actuators to enable the pilot to provide input and adjust aircraft settings. This can allow the pilot to control, for example, throttle settings for the various propulsion systems, to adjust the rudder and ailerons, and so on.

Inputs from the user are interpreted by aircraft control system 234 to translate user inputs into commands for aircraft control. In some applications, this can be a translation of direct commands such as throttle inputs, rudder control, flap adjustment and so on. Control inputs can also include higher level commands such as rotation rate or rate over ground, etc., which can be translated into aircraft system control commands. These commands are communicated to aircraft 200 via command/telemetry interface 232 and command/telemetry interface 224. Functionality for aircraft control can be distributed among aircraft control system 234 and onboard aircraft control 222 as may be appropriate depending on the system configuration.

An autopilot system 238 can also be provided to control the aircraft via computerized or automated control with little or no input required by a human pilot. Although illustrated in this example as part of remote control system 202, part or all of the functionality of autopilot system 238 can be provided at aircraft 200. Although not illustrated, in some embodiments an onboard autopilot system can be included with the aircraft 200 to enable local autopilot control, which may ease the load on the command/telemetry interfaces.

Also illustrated is an onboard yaw control system 228 and a remote yaw control system 240. An automatic yaw control system can be included to provide yaw control of the aircraft including control according to the embodiments disclosed herein. Such yaw control system can include an input to receive information about the aircraft, such as aircraft system data (e.g., sensor data), control data and flight data and can be configured to provide yaw control by controlling various aircraft systems such as rotor torque or tilt, for example either directly or as part of the overall aircraft control (e.g., as part of onboard aircraft control 222 or aircraft control system 234). That is, the automatic aircraft recovery system can be configured to receive aircraft parameters, and make yaw control determinations. Examples of this yaw control are described in further detail below with reference to FIGS. 3 and 4.

Although the functional components of remote control system 202 (e.g., aircraft control system 234, control dashboard and GUI 236, autopilot system 238, and command/telemetry interface 232) and aircraft 200 are partitioned in this example in the manner as illustrated in FIG. 2, it is noted that this partitioning is done for clarity of description and by way of example only. After reading this description, one of ordinary skill in the art will understand how different architectures or alternative partitioning can be used for aircraft 200 or remote control system 202. Additionally, components such as processing devices, memory components, communications buses, and so on can be shared among these multiple functional units. Indeed, in some applications, for example, a single microprocessor (whether single or multi-core) system can be used to implement the various described functions of remote control system 202 (e.g., aircraft control system 234, and autopilot system 238, as well as portions of control dashboard in GUI 236 and command/telemetry interface 232) or aircraft 200.

Figure 3:
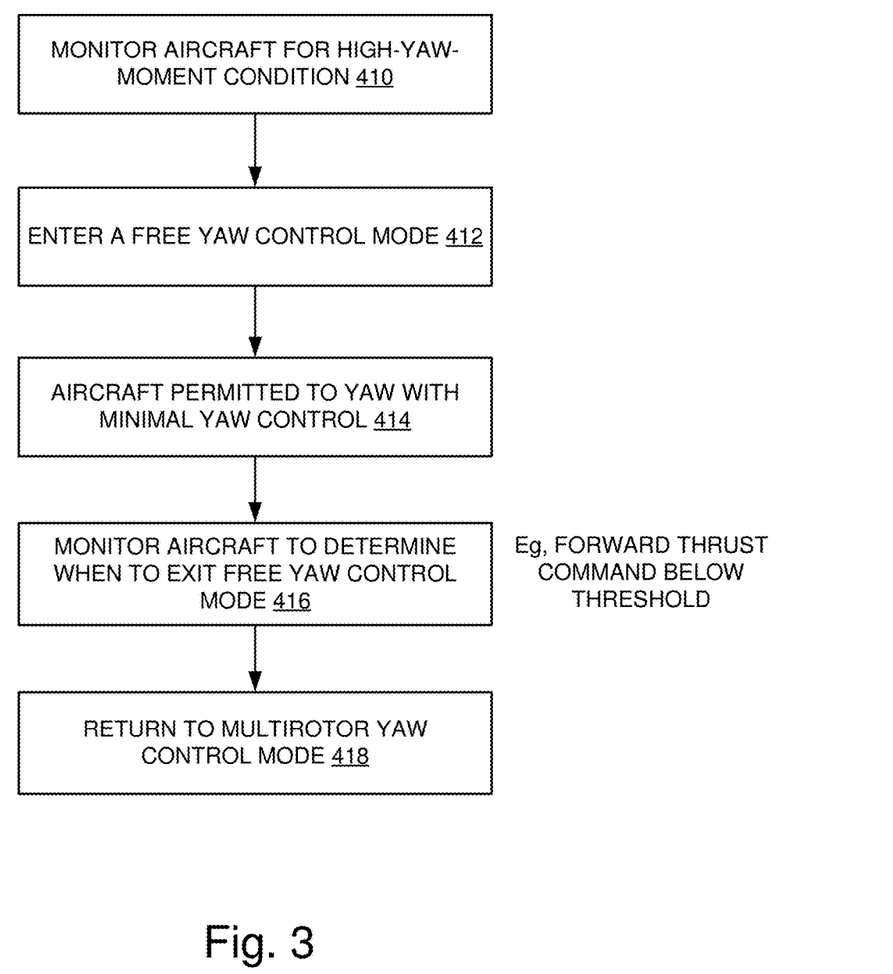
FIG. 3 is a diagram illustrating an example process for yaw control in accordance with one embodiment of the systems and methods described herein.

FIG. 3 is a diagram illustrating an example process for yaw control in accordance with one embodiment of the systems and methods described herein. With reference now to FIG. 3, at operation 410 the yaw control system monitors the aircraft parameters to make yaw control determinations. A yaw control processor 228, which may be part of onboard aircraft control processor 222 or yaw control processor 240, which may be part of onboard aircraft control processor 234, or both, can monitor these parameters and make determinations about the aircraft status in general and yaw control status in particular. In various embodiments, the system evaluates the parameters to determine whether a high-yaw-moment condition exists. That is, in some embodiments the system determines whether the yaw moment of the aircraft is above a particular predetermined threshold. This can be evaluated, for example, by monitoring the yaw moment requested of the VTOL multi-rotor control system (e.g., a multirotor control system having blended forward thrust control and a control-bound tolerant control scheme) to determine whether the requested yaw moment rises above a predetermined threshold.

The yaw moment required of the aircraft VTOL system is in large part driven by the desire in some stages of flight for the aircraft to point its nose in a particular direction, which may be different from the current direction of the relative wind. Fixed wing aircraft generally have a tendency to weather-vane into the relative wind and the yaw moment required by the VTOL system to counter this natural stability may be large. Therefore, a method to reduce the control authority required of the VTOL system, and therefore its size, weight, and power required, is advantageous.

Where a high-yaw-moment condition is detected, the system configures the aircraft into a free yaw control mode at operation 412. In various applications this can be a mode of flight in which the yaw control is reduced by a determined amount, minimized, or even turned off such that the aircraft is allowed to rotate somewhat freely about its yaw axis. In this mode the airflow of the relative wind over the aircraft may be the largest or the sole factor orienting the aircraft. As indicated above, in some embodiments there is no yaw control applied in this mode while in other embodiments some amount of yaw control remains. For example, in this mode, yaw control may be used to damp motion but is not applied in an attempt to correct an amount of heading error. This is illustrated at operation 414.

At operation 416, the system continues to monitor aircraft parameters to determine whether to remain in free yaw control mode or whether to exit free yaw control mode. When the aircraft is in a free yaw control mode, its yaw control moment is by definition low. Accordingly, in some embodiments, the system can be configured to monitor the control law's forward thrust command to determine whether to exit the free yaw control mode. As a further example, when the forward thrust command is below a determined threshold, the controller can infer that the requirement for allowing the aircraft to rotate freely now that yaw control is no longer present. In such a condition, the system can return the aircraft to a normal multirotor mode in which the yaw orientation is controlled. This is illustrated at operation 418. This control, for example, can be yaw control to command the yaw of the aircraft to an orientation value relative to the earth.

Figure 4:
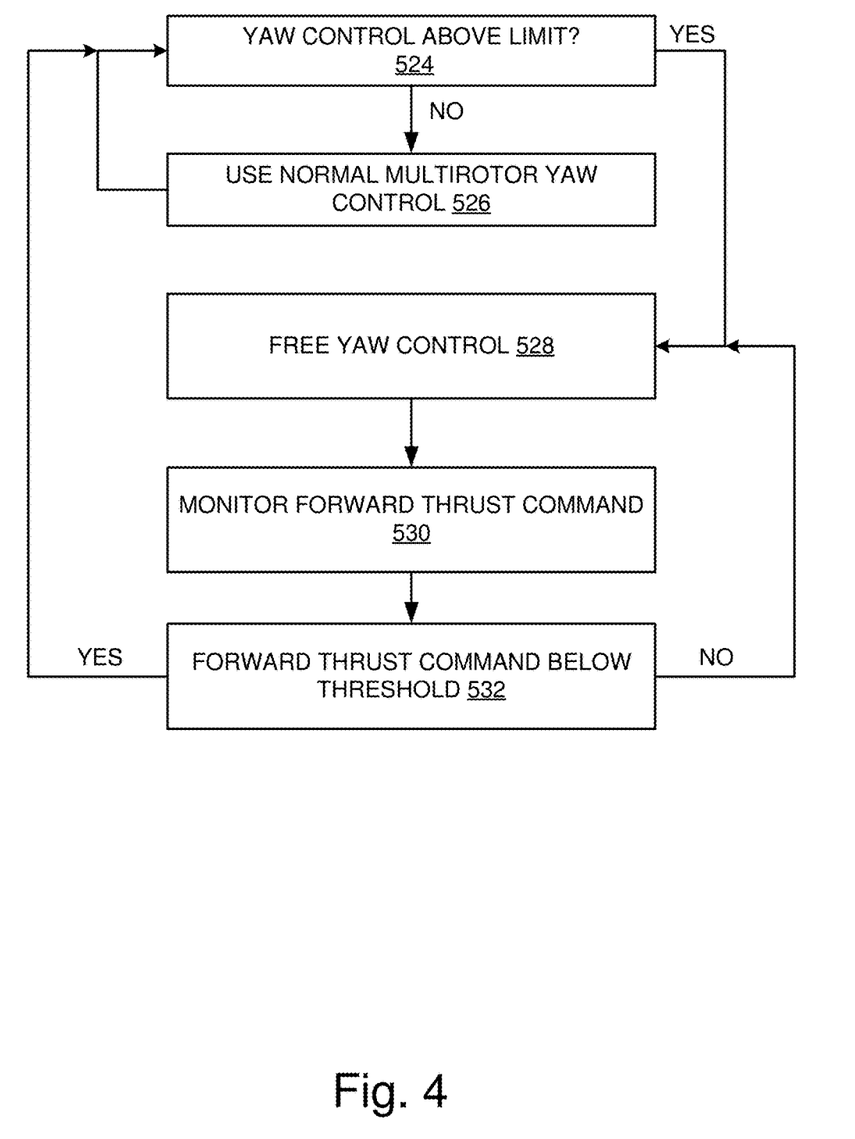
FIG. 4 is a diagram illustrating an example logic decision tree that can be used by the on-board or remote control system in accordance with one embodiment of the technology disclosed herein.

FIG. 4 is a diagram illustrating an example logic decision tree that can be used by the on-board or remote control system in accordance with one embodiment of the technology disclosed herein. Referring now to FIG. 4, in this example the system determines whether the yaw control is above a predetermined limit at operation 524. If not, the conventional aircraft yaw control mode remains in effect at operation 526. For example, this can be all control applied by torque vectoring of the various VTOL rotors of the aircraft, a well-known method of control for multirotor aircraft. If, on the other hand, the yaw control is above a predetermined limit, then at operation 528 the free yaw control mode is engaged. As noted above, in the free yaw control mode little or no yaw control is maintained of the aircraft, and the aircraft is free to move about its yaw axis somewhat freely. In this mode, however, the system monitors the forward thrust command to determine whether the aircraft should remain in free yaw control mode. This is illustrated at operation 530. As long as the forward thrust command does not fall below a defined threshold (operation 532), the system remains in the free yaw control mode. However, when the forward thrust command falls below a defined threshold, this may indicate that the aircraft is slowing or hovering, or the wind has died down, and the system is returned to a normal yaw control mode (e.g., using multirotor yaw control) until the yaw control rises above the predefined limit.

Embodiments of the systems and methods described herein can be configured such that a lower amount of thrust overhead is required for the VTOL system to implement yaw control as compared to aircraft that do not have a free yaw control mode. This can reduce system costs as well as reduce the weight of the VTOL system relative to the aircraft mass. Embodiments can also be configured such that the control system accounts for the aircraft's inability to compensate for wind when the VTOL system saturates. Enabling a free yaw control mode can also reduce or minimize the control inputs to the yaw moment, preserving thrust that can be used for the VTOL system lifting capability. This can also allow implementation of more efficient rotor configurations as a lower amount of overall torque (or the torque to thrust ratio) require for each motor may not be as high.

The system configured to perform the functions for combined pitch and forward thrust control in accordance with the technology disclosed herein can be implemented on board the aircraft or at the remote control system, or the functions can be distributed across these two platforms. The various subsystems or blocks described herein may be implemented utilizing any form of hardware, software, or a combination thereof. These may be further referred to herein as a processing block, processing module, or processor. A processing block, processing module, or processor may include, for example, one or more processors, controllers, central processing units, ASICs, PLAs, PALs, PLDs, CPLDs, FPGAs, logical components, or other mechanism or device that manipulates or operates on signals, whether analog or digital, based on hard coding or wiring of the circuitry, the execution of operational instructions, or a combination thereof.

The processing block, processing module, or processor may further include, memory (separate, integrated or embedded from the one or more processors), which may be include one or more memory devices. Such a memory device may include, for example, one or a combination of memory types such as read-only memory, random access memory, volatile and non-volatile memory, static memory, dynamic memory, flash memory, cache memory, or other information storage device, whether magnetic, acoustic, optical or otherwise.

One or more processing devices may be centrally located or may be distributed across locations (e.g., cloud computing via indirect coupling via a local area network and/or a wide area network). For example, in implementation, the various subsystems or blocks described herein might be implemented as discrete modules or the functions and features described can be shared in part or in total among one or more processing modules. In other words, as would be apparent to one of ordinary skill in the art after reading this description, the various features and functionality described herein may be implemented in any given application and can be implemented in one or more separate or shared processing modules in various combinations and permutations. Even though various features or elements of functionality may be individually described or claimed as separate subsystems or blocks, one of ordinary skill in the art will understand that these features and functionality can be shared among one or more common software and hardware elements, and such description shall not require or imply that separate hardware or software components are used to implement such features or functionality.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An unmanned aircraft, comprising:
    a forward propulsion system comprising a forward thrust engine and a first rotor coupled to the forward thrust engine;
    a vertical propulsion system comprising a plurality of vertical thrust engines and a plurality of second rotors each coupled to one of the plurality of vertical thrust engines;
    a plurality of sensors; and
    a yaw control system, comprising a processor configured to monitor one or more aircraft parameters received from at least one of the plurality of sensors and to enter a free yaw control mode by determining that a high-yaw moment condition exists based on the received aircraft parameters.

2. The unmanned aircraft of claim 1, wherein determining that a high-yaw moment condition exists comprises:
    monitoring at least a yaw moment parameter of the received aircraft parameters, the yaw moment parameter associated with a vertical takeoff and landing (VTOL) multirotor system control of a yaw orientation;
    determining whether the monitored yaw moment parameter is above a predetermined threshold; and
    entering the free yaw control mode if the monitored yaw moment is above the determined threshold.

3. The unmanned aircraft of claim 2, wherein the processor is further configured to monitor the unmanned aircraft to determine whether to exit the free yaw control mode.

4. The unmanned aircraft of claim 3, wherein monitoring the unmanned aircraft to determine whether to exit the free yaw control mode comprises determining whether a forward thrust for the unmanned aircraft is below a determined threshold.

5. The unmanned aircraft of claim 2, wherein the free yaw control mode comprises eliminating yaw control for the unmanned aircraft such that the yaw orientation is controlled by an airflow of relative wind.

6. The unmanned aircraft of claim 2, wherein the free yaw control mode comprises reducing yaw control for the aircraft such that the yaw orientation is at least partially controlled by an airflow of relative wind.

7. The unmanned aircraft of claim 1, wherein the unmanned aircraft is a multirotor aircraft and the vertical propulsion system comprises four vertical thrust engines and four corresponding rotors.

8. The unmanned aircraft of claim 1, wherein the unmanned aircraft is a hybrid multirotor aircraft.

9. The unmanned aircraft of claim 1, wherein the forward thrust engine comprises an internal combustion engine or an electric motor.

10. An unmanned aircraft system, comprising:
    an unmanned aircraft, comprising:
        a forward propulsion system comprising a forward thrust engine and a first rotor coupled to the forward thrust engine;
        a vertical propulsion system comprising a plurality of vertical thrust engines and a plurality of second rotors each coupled to one of the plurality of vertical thrust engines;
        an onboard aircraft controller comprising a first output coupled to the forward propulsion system and a second output coupled to the vertical propulsion system; and
        a first communication transceiver coupled to the aircraft controller configured to communicate with a remote control system;
    the remote control system, comprising:
        a second communication transceiver configured to communicate with the unmanned aircraft; and
        an aircraft control system communicatively coupled to the second communication transceiver; and
    a yaw control system, comprising a processor configured to monitor one or more aircraft parameters received from at least one of a plurality of sensors and to enter a free yaw control mode by determining that a high-yaw moment condition exists based on the received aircraft parameters.

11. The unmanned aircraft system of claim 10, wherein determining that a high-yaw moment condition exists comprises:
    monitoring at least a yaw moment parameter of the received aircraft parameters, the yaw moment parameter associated with a vertical takeoff and landing (VTOL) multirotor system control of a yaw orientation;
    determining whether the monitored yaw moment parameter is above a predetermined threshold; and
    entering the free yaw control mode if the monitored yaw moment is above the determined threshold.

12. The unmanned aircraft system of claim 11, wherein the processor is further configured to monitor the unmanned aircraft to determine whether to exit the free yaw control mode.

13. The unmanned aircraft system of claim 12, wherein monitoring the unmanned aircraft to determine whether to exit the free yaw control mode comprises determining whether a forward thrust for the aircraft is below a determined threshold.

14. The unmanned aircraft system of claim 11, wherein the free yaw control mode comprises eliminating yaw control for the unmanned aircraft such that the yaw orientation is controlled by an airflow of the relative wind.

15. The unmanned aircraft system of claim 11, wherein the free yaw control mode comprises reducing yaw control for the unmanned aircraft such that the yaw orientation is at least partially controlled by an airflow of relative wind.

16. The unmanned aircraft system of claim 10, wherein the unmanned aircraft is a multirotor aircraft and the vertical propulsion system comprises four vertical thrust engines and four corresponding rotors.

17. The unmanned aircraft system of claim 10, wherein the unmanned aircraft is a hybrid multirotor aircraft.

18. The unmanned aircraft system of claim 10, wherein the forward thrust engine comprises an internal combustion engine or an electric motor.

* * * * *